Figure 1:
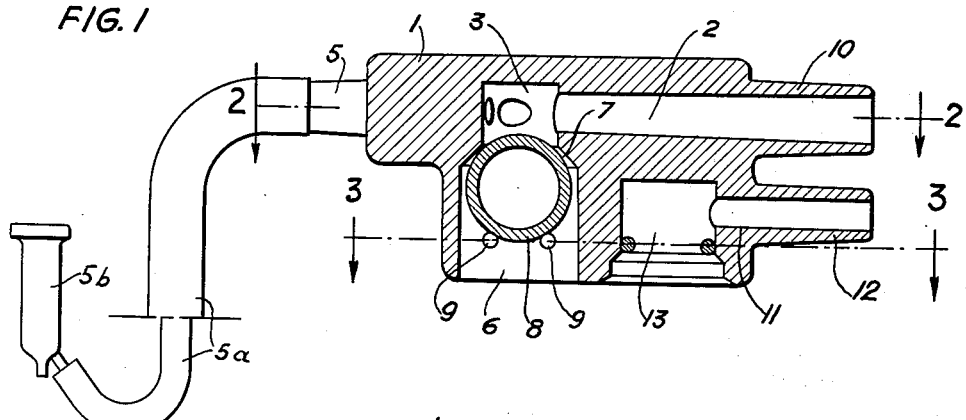

Jan. 14, 1964 J. A. J. A. DUJARDIN ETAL 3,117,553
ELECTRONICALLY CONTROLLED MILKING INSTALLATION
Filed Feb. 16, 1960 3 Sheets-Sheet 1

INVENTORS:
Jean A. J. A. Dujardin
Joseph L. M. Logeot
By Hofgren, Brady, Wegner, Allen & Stellman
ATTORNEYS

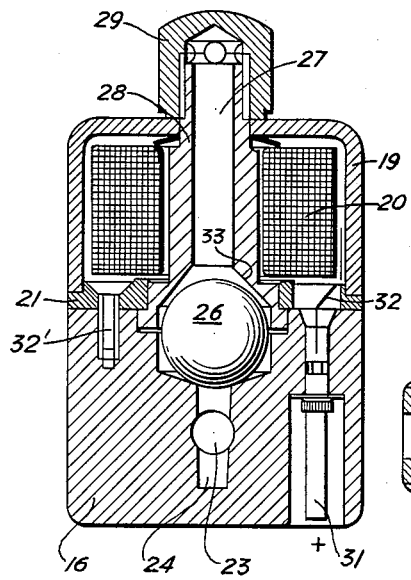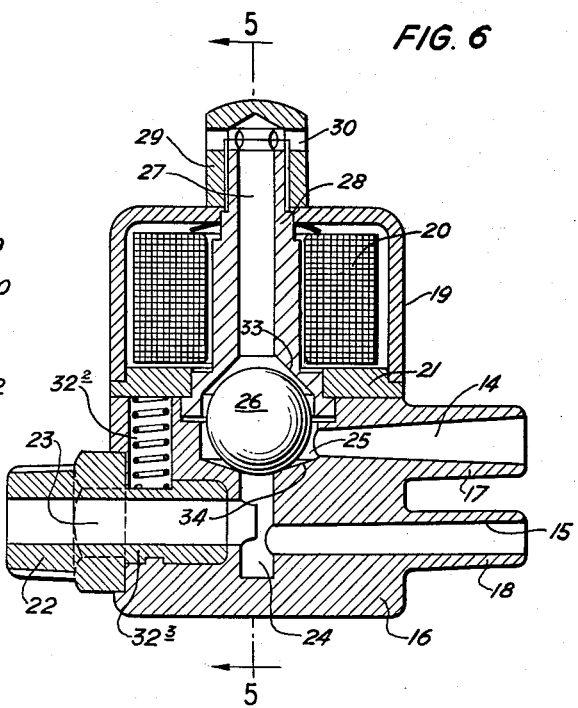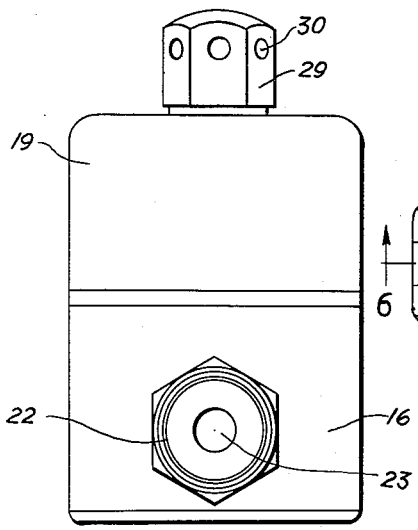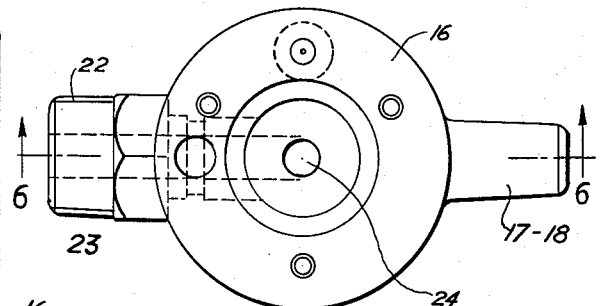

United States Patent Office 3,117,553
Patented Jan. 14, 1964

3,117,553
ELECTRONICALLY CONTROLLED MILKING INSTALLATION
Jean Armand Julien Albert Dujardin and Joseph Léonard Marie Lageot, both of Remicourt, Belgium, assignors to Babson Bros. Co., a corporation of Illinois
Filed Feb. 16, 1960, Ser. No. 9,133
Claims priority, application Belgium Feb. 19, 1959
4 Claims. (Cl. 119—14.28)

This invention relates to an electronically controlled milking installation, having a magnetic valve (electromagnetic valve) controlling the pulsations and a pneumatic relay.

One of the objects of the invention is to provide an installation comprising a pneumatic relay which has no mechanical element and which at the same time gives greater rapidity, a more progressive action, and increased efficiency of the milking operations.

According to the invention, there is provided an electronically controlled milking installation, including a magnetic valve (electromagnetic valve) for controlling the pulsations and a pneumatic relay, wherein the relay comprises an upper radial conduit to which tubes leading to the milking cups are connected, and there is provided, beneath the centre of intersection of these conduits and along a vertical axis, a chamber which is open at the bottom and forms at the top a seat for a movable ball for which retaining means are provided at the bottom, the said ball being controlled by the ambient air and acting in such manner that, as soon as the absolute pressure in a conduit connecting the electromagnetic valve to the pneumatic relay begins to rise, the said ball drops and there is an additional re-entry of air in the said chamber, this re-entry of air enabling the massage of the teats to be accelerated.

The invention also relates to various features of the electromagnetic valve, which is distinguished more especially in that it is fixed on the general vacuum line and has a horizontal conduit which is connected on the one hand to said line and on the other hand to a vertical conduit which opens at its upper end into a chamber where a ball is situated, and in that there further leads into the said chamber at the top a vertical bore forming a vent connected with atmosphere and provided in a core and situated at the centre of the coil of the electromagnet.

A horizontal conduit establishing communication with the interior of the milking pot preferably discharges into the vertical conduit situated beneath the chamber.

Another important feature of the installation is that the electromagnetic valve may be subjected to the action of an electronic impulser, preferably of the transistorized type.

The accompanying drawings show an installation according to the invention by way of example.

Figure 2:
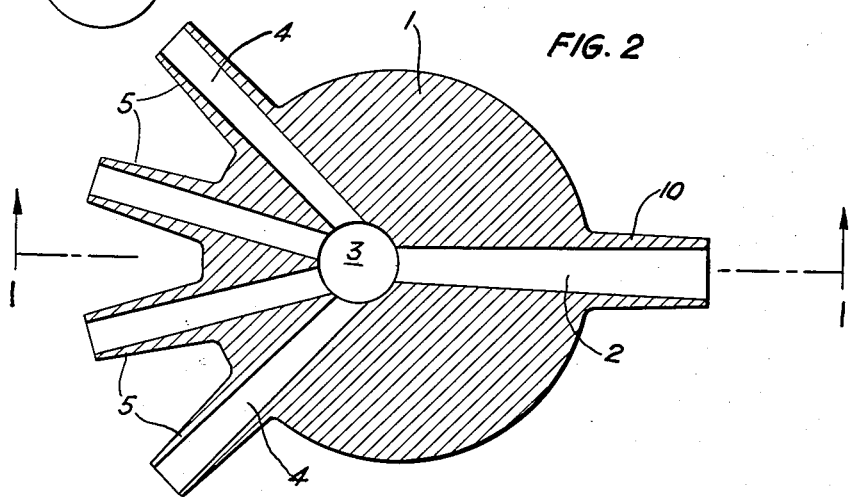
Figure 3:
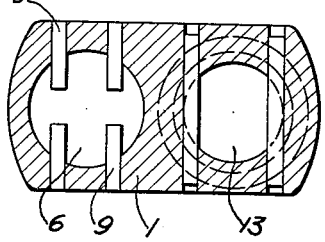
Figure 4:
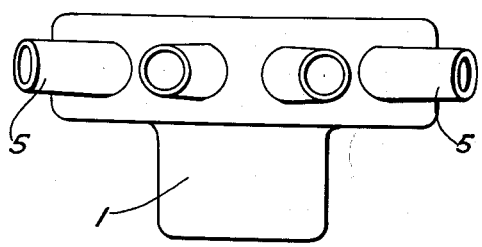
Figure 9:
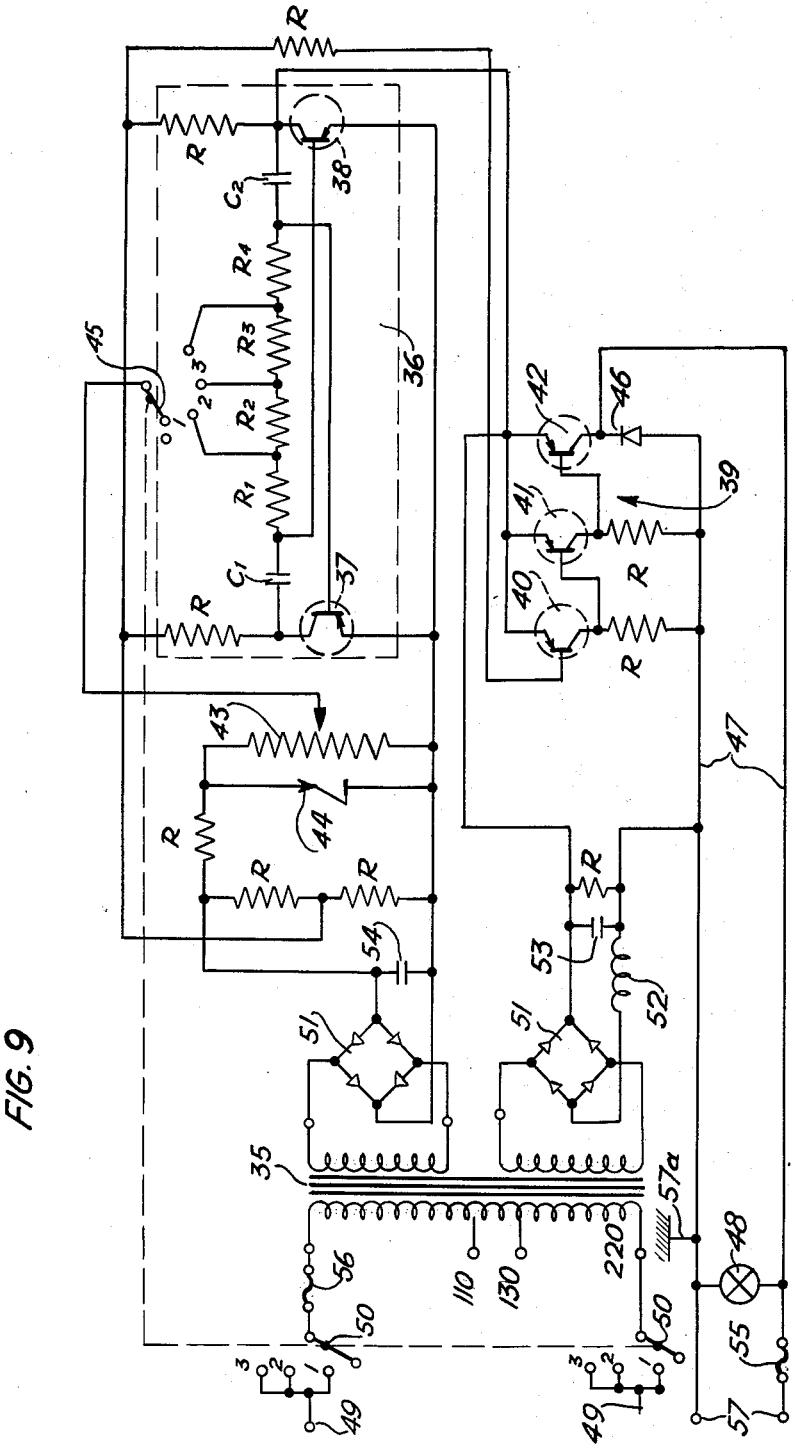

FIGURES 1 to 4 relate to the pneumatic relay, FIGURES 5 to 8 to the electromagnetic valve, and FIGURE 9 the electronic impulser;
FIGURE 1 is a section on the line I—I in FIGURE 2;
FIGURE 2 is a section on the line II—II in FIGURE 1;
FIGURE 3 is a section on the line III—III in FIGURE 1;
FIGURE 4 is an elevation;
FIGURE 5 is a section on the line V—V in FIGURE 6;
FIGURE 6 is a section on the line VI—VI in FIGURE 8;
FIGURE 7 is an elevation;
FIGURE 8 is a plan view of the body of the electromagnetic valve; and
FIGURE 9 is a diagram relating to the electronic transistorized impulser.

The relay is formed by a body 1 containing an upper radial conduit 2 leading into a space 3 from which issue the bores 4 extending to the nipples 5 which are formed with the body 1 by injection and to which the tubes, as 5a, leading to the milking cups are connected.

Beneath the space 3 constituting the center of intersection of the nipples a chamber 6 is provided which is open at the bottom and hence in communication with atmosphere.

At the top, this chamber forms a seat 7 for a steel ball 8, which is preferably rubber-covered and which is held at the bottom by pins 9 disposed horizontally.

Parallel to the radial conduit 2 which terminates in a nipple 10 and beneath said conduit there is a second radial conduit 11 which terminates in a nipple 12 and which leads into a chamber 13, the axis of which is parallel to that of the chamber 6. Said chamber 13 serves for fitting the relay on the lid of the milking pot (not shown).

The conduits 2 and 11 are connected by tubes (not shown) fitted to the connections 10 and 12 respectively, to conduits 14 and 15 (FIGURES 5 and 6) provided in an electromagnetic valve shown in FIGURES 5 to 8.

This electromagnetic valve is constituted by two principal parts which are: the base 16 provided with connections 17 and 18 at which the conduits 14 and 15 terminate, and a casing 19 in which is situated the electromagnet coil 20, or control member, resting on the base 16 by means of a ring 21 constituting the lower part of the casing.

Electromagnetic valves of this type are fixed in selected positions on the general vacuum line (not shown), for example by screwing, by means of a metal branch 22 formed with a bore 23 continuing inside the base 16 as far as a vertical conduit 24 into which the conduit 15 discharges.

The horizontal conduit 14 and the vertical conduit 24 lead into a central chamber 25 containing a ball 26.

A vertical bore 27 also leads into the chamber 25 at the top, said bore being provided in a core 28 forming a vent and situated in the center of the coil of the electromagnet and terminating, after passing through the casing 19 in a threaded end on which a cap nut 29 is fitted.

The bore 27 communicates with atmosphere through holes 30 drilled in the cap 29.

When the electromagnet is under voltage, the radial conduit 2 of the relay is connected by the upper conduit 14 of the electromagnetic valve (FIGURES 5 to 8) to the vacuum source (vertical conduit 24 and bore 23) and the ball 8 of the relay is applied against its seat 7 by the external air.

Having regard to the inertia of this ball, the negative pressure in each teat-cup chamber is re-established on each cycle with a certain progressiveness which cannot be obtained solely by the use of an electromagnetic valve the operative member of which is subjected to the action of an electromagnet and hence to a movement which, since it is instantaneous, is very rapid.

Conversely, when the electromagnet is de-energized the ball 8 of the relay leaves its seat by the action of gravity, before the atmospheric pressure is completely re-established in the ball chamber and the air can immediately rush into the chamber between the cup and the teat thus effecting the immediate massage of the teats, without this air having to be taken through the rubber tube connecting the electromagnetic valve to the relay.

In a pneumatic relay of this kind the ball acts to accelerate the re-entry of the ambient air into the chamber contained between the cup and the teat, thus increasing the period of time of massage of the teats on each pulsating cycle.

Other advantages are as follows:
(1) Total absence of any mechanical member or a member operating by means of some pneumatic distributing arrangement.

(2) In consequence of the radial passages, the relay may be produced by injection moulding of a thermoplastic substance, which gives a very low cost price.

(3) All the branches for the connection of the rubber tubes leading to the electromagnetic valve and to the milking cups may be formed by injection moulding.

(4) This relay may be made of a transparent thermoplastic material which permits visual inspection of operation simply by examination of the cyclic movements of the ball.

With regard to the magnetic valve, it will be borne in mind that by the use of the ball 26 it is possible to produce an electromagnet having no air gap, hence an electromagnet of particularly simple manufacture and consequently inexpensive. The use of a ball as valve member permits a strictly minimum valve lift and hence the energy to be used is at a minimum. It follows from this that the magnetic flux generating winding requires only an extremely low power.

Another feature of this electromagnet is that the frame or coil on which the current conducting wire (coil wire) is wound is of a non-magnetic metal to which the coil input wire is soldered. When this soldered joint has been made, the normal winding is carried out, terminating in a single free strand.

This has two advantages:

(1) In the event of accidental breakage of this strand, the winding can easily be restored simply by unwinding one turn to locate a free strand, this reduction of one turn on the winding having no substantial modification of the electrical characteristics of the winding.

(2) The input strand of the winding being soldered to the brass frame, the latter is automatically at earth or reference potential, which simplifies the electrical connection of the electromagnetic valve.

Moreover, this design is particularly suitable for simplifying the general electrical installation which need contain only a single conductor extending over the entire length of the air conduit of the installation and from the excitation current generator.

The electrical conductor is connected to the positive pole of the source of current, while the negative of the same source is electrically connected to the main air conduit in steel tubes.

Since the frame of the excitation coil is at earth potential, it is sufficient to connect the outer free strand of the winding to the positive conductor of the current source for the current to be able to circulate in the winding of the electromagnetic valve. This connection is made by means of a female plug connected to the insulated electrical conductor on the air conduit: this plug fits in the base of the electromagnetic valve where a pin 31 is provided which is connected by a wire 32 to the free outer strand of the winding.

The current therefore arrives from the generator to the free strand of the winding and the return takes place through the air conduit on passing through the winding and its metal frame.

When this current circulates, the magnetic field created attracts the ball 26 of cadmium-plated or zinc-plated soft iron against the conical seat 33 provided in the soft iron core 28 of the electromagnet. In this position the ball prevents the ambient air from entering the ball chamber 25 where partial vacuum is established.

When the excitation current no longer passes through the winding, the ball 26 is pushed away from its upper seat under the influence of its own weight and under the thrust of the weight of the column of air acting on the ball through the bore 27 and corresponding to the absolute pressure acting at the precise moment when the excitation of the magnetic circuit ceases.

When the ball 26 drops back onto its lower seat 34, it uncovers the opening of the bore 27 of the soft iron core of the electromagnet and atmospheric pressure prevails in the chamber 25. From that moment on, the ball prevents air from entering the vertical conduit 24 of the lower seat and is applied against it by its weight and by the weight of the column of air which it supports.

These movements of a ball under the alternate effects of the magnetic flux and the partial vacuum existing in the lower conduits of the base of the electromagnetic valve permit the creation of compression and decompression phases which are transmitted by the pneumatic relay to the chamber contained between each cup and teat.

It should be noted that two-way, three-way and four-way magnetic valves are known industrially and used in a multitude of applications.

Thus pneumatic milking machines have long been known in which the pulsations are controlled by electromagnetic or semi-electronic devices.

The electromagnetic valve according to the invention has a number of special features which ensure its perfect electro-pneumatic operation while using only a minimum effective power.

This electromagnetic valve is of the four-way type, two of these ways (conduits 15 and 23) being constantly under negative pressure; the other two conduits 24 and 27 on one and the same axis but opposed permit the alternation of a partial vacuum and of atmospheric pressure between the cup and teat.

The ambient air has access to the ball chamber 25 when the coil and the electromagnetic are not under voltage, hence when the ball rests on its lower seat 34 provided in the base.

In this position of the ball the air enters the chamber between the cup and the teat: this is the compression phase of the teat, and any entry of air into the conduits under negative pressure is rendered impossible.

When the excitation current circulates in the coil, the ball 26 is immediately attracted against its upper seat 33; it closes the vent 27 of the central core; the air contained in the ball chamber and in the space between the cup and teat can then be drawn in towards the air pump; this is the teat decompression phase.

The electromagnetic valve according to the invention has all its air conduits in one and the same vertical aspect; they are therefore radial and lead into the ball chamber.

It follows that the base may be made by moulding a thermoplastic material; the removal of the conical pins corresponding to the conduits is effected without difficulty. With regard to the bores of hte ball chamber and the bore for the current supply point, they have their axis parallel to the vertical axis of the air base which is easily moulded. In other words, the base of the magnetic valve can be produced in a simple mould by injection of a thermoplastic and its cost price is strictly at a minimum.

The soft iron support 21 for the brass frame winding is fixed on the base by means of three screws 32. The design of this supporting part and of the soft iron core of the electromagnet also enables them to be connected and locked in position on the base.

This supporting part and the central core are produced by turning, and are hence of a low cost price.

Since the frame of the coil constitutes the output pole for the current circulating in the coil and the said frame bears on the soft iron support, it is sufficient to interpose a spring $32^2$ between the latter and the brass base $32^3$ which is fitted by screw connection in the connections 32 welded on the air conduit, in order that this conduit may thus act as return conductor for the current circulating in the winding.

The winding finally capped by the cylindrical soft iron cap 29 the base of which has a central hole which engages over the threaded end of the core of the electromagnet, and the assembly is locked by a single nut 29 likewise of cadmium-plated steel formed with lateral holes 30 which permit access of the ambient air to the vertical vent of the central core.

In known magnetic valves the seat of the operative valve piston is generally of a non-magnetic metal, for two reasons:

(1) To avoid sticking of the soft iron piston due to residual magnetism, (2) To break the magnetic circuit in order to compel the magnetic flux to act on the valve piston; the magnetic circuit is therefore constantly open.

According to the invention, the magnetic circuit is closed, and there is therfore no air gap, but this magnetic circuit is characterized by a narrowing of the iron at the base of the central core, and this greatly increases the action of the magnetic flux on the ball from its central horizontal plane.

This electromagnetic valve is therefore distinguished by the following points:

(1) The operative valve member is a soft iron or steel ball which is covered with a fine coating of cadmium or zinc by electrolysis; this prevents sticking of the ball through residual magnetism and prevents any damage of the outer surface of the ball through oxidation.

(2) The ball moves between two opposed conical seats which permit operation of the valve in all positions, hence without it being necessary to ensure a vertical position.

(3) The ball permits the flow of air into the ball chamber with minimum braking, thus enabling its lift or stroke to be reduced.

In consequence, a low magnetic flux is used, produced by the passage of the excitation current through a coil of low electrical power consumption.

(4) The magnetic circuit is closed, hence without an air gap, thus simplifying the production of the electromagnetic valves.

(5) The frame of the coil generating the magnetic field is of brass and may therefore easily be connected to earth potential, thus eliminating a connecting strand.

(6) The base of thermoplastic material may be obtained by injection in a simple mould having radial or vertical pins.

(7) Three screws and a nut are sufficient to lock together all the constituent parts of the electromagnetic valve.

FIGURE 9 shows the diagram of a transistorized electronic impulser which can advantageously be used to feed the electromagnetic valves.

This electronic impulser contains a transformer 35, the primary of which has tappings for connection to 110–130 or 220 volts (A.C.) supply systems and feeding a pulse generator or oscillator 36 containing inter alia the transistors 37–38 and rectifier cells which deliver the 12 volt rectified current for the supply for the electromagnetic valves.

This generator delivers rectangular or square signals which are amplified by the amplifier circuit 39 by means of three transistors 40—41—42 connected in cascade.

The frequency of the pulses is adjustable continuously by means of a potentiometer 43 which is designed to attain 40 to 70 cycles per minute.

This adjustment is effected by variation of the bias of the base elements of the two transistors 37 and 38 of the pulse generator. The bias voltage is stabilized by a selenium diode 44 which ensures stable operation of the apparatus even when the variations of the transformer supply voltage are ±10%.

The ratio of the period during which the electromagnetic valves are in operation to the period during which they are out of operation is controlled by a four-position switch 45, one of which positions is the stoppage position which enables the two phases of the supply circuit to be broken. The various resistances $R_1$—$R_2$—$R_3$—$R_4$ of the pulse circuit enable the ratios 1/1–2/1–3/1 to be obtained by switching. Adjustment of the cyclic ratio is effected by modification of the charge and discharge circuits of the two coupling condensers $C_1$ and $C_2$ in the collector base element circuits of transistors 37 and 38 of the pulse generator.

As will be apparent from the diagram the cyclic adjustment entails no variation of the frequency owing to the fact that the sum of the time constants of the two circuits remains invariable.

Excess voltages (excess current on breaking) due to abrupt breaking of the supply of the electromagnetic valves when they are put out of operation are absorbed by a rectifier cell 46 connected in shunt with the output circuit 47.

A lamp or light signal 48 is also connected in parallel with the same output circuit and can thus flash with the frequency of the pulses.

The diagram also shows:

At 49, the input terminals of the supply system;
At 50, the input switch and the on/off switch;
The switch 45 is connected to the input switch 50.
At 51, bridge-connected selenium rectifier cells;
At 52, a smoothing choke and at 53 and 54 smoothing condensers;
At 55—56, protective fuses;
At 57, the terminals, one of which is connected with ground or reference potential 57a for the output current (of about 12 volts for example). The output terminals 57 are connected, as described above, with coil 20 of the electromagnetic value (FIGURES 5–8).

The very great advantage of this pulse generator is that it is entirely static, hence without relay or electromagnetic contactor: this results in long operating life, absence of electric arc, and extra-silent operation.

This device makes no use of any electronic tube: this is a definite advantage over apparatus provided with valves of limited life and subject to adverse influences which frequently impair their operation.

We claim:

1. In a milking system having a milk cup and electromagnetic valve means including a valve operating coil, for controlling the application of vacuum and air to said milk cup to effect pulsations therein, said coil having two terminals with one returned to a reference potential, an electronic control circuit comprising: an oscillator having an output of substantially rectangular wave form; a circuit which determines operating frequency connected with an element of said oscillator; a circuit which determines the duration of said oscillator output wave connected with an element of the oscillator; and a pair of output terminals for said control circuit, connected with said oscillator and with said valve coil, one of said output terminals being at said reference potential.

2. The pulsator control of claim 1 wherein said oscillator is a multivibrator having two sections with a coupling circuit therebetween and means for adjusting said coupling circuit to vary the duration of a period of operation of said multivibrator, said circuit further including an adjustable bias means connected with each section, for controlling the frequency of said multi-vibrator, without affecting said operation period duration.

3. The control circuit of claim 2 wherein said oscillator is a multivibrator utilizing two transistors with a resistance-capacitance coupling circuit therebetween, said resistance portion of the coupling circuit being made up of a plurality of series connected resistors, means providing a bias source for said multivibrator including a potentiometer with an adjustable tap thereon, and switch means connected between said adjustable tap and a selected point of said series resistor circuit, movement of said potentiometer tap varying the frequency of operation of said multivibrator without affecting the operation of period duration, while adjustment of said switch means varies the period duration without affecting the frequency of operation.

4. In a milking system having a milk cup and electromagnetic valve means including a valve operating coil for controlling the application of vacuum and air to said milk cup to effect pulsations therein, said coil having two terminals, an electronic control circuit comprising: an oscillator having an output of substantially rectangular wave form; a circuit which determines operating frequency connected with an element of said oscillator; a circuit which determines the duration of said oscillator output wave connected with an element of the oscillator; and a pair of output terminals for said control circuit, connected with said oscillator and with said valve coil during a portion of the cycle of said oscillator there being a potential difference between said terminals energizing said valve coil, and during another portion of the cycle, the potential difference being insufficient to energize the valve coil.

References Cited in the file of this patent

UNITED STATES PATENTS

| | | |
|---|---|---|
| 961,960 | Hicks | June 21, 1910 |
| 1,405,104 | Daysh et al. | Jan. 31, 1922 |
| 1,745,092 | Hapgood | Jan. 28, 1930 |
| 1,854,305 | Hapgood | Apr. 19, 1932 |
| 2,434,586 | Reynolds | Jan. 13, 1948 |
| 2,496,470 | Hodsdon | Feb. 7, 1950 |
| 2,600,299 | Johannes | June 10, 1952 |
| 2,718,871 | Robley | Sept. 27, 1955 |
| 2,777,420 | Schilling | Jan. 15, 1957 |

FOREIGN PATENTS

| | | |
|---|---|---|
| 795,702 | Great Britain | May 28, 1958 |